Aug. 12, 1969
J. LA TORRE
3,460,429
EXPANSIBLE FASTENER WITH EXPANDER THEREFOR
Filed April 19, 1967
2 Sheets-Sheet 1
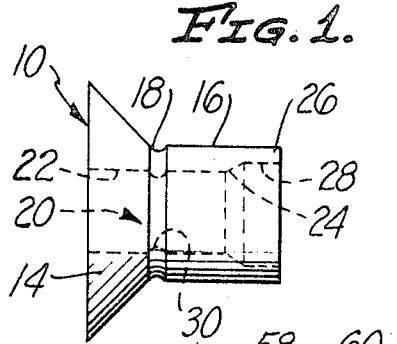
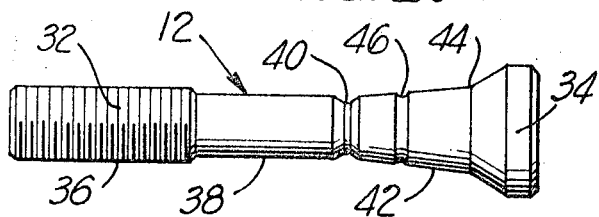
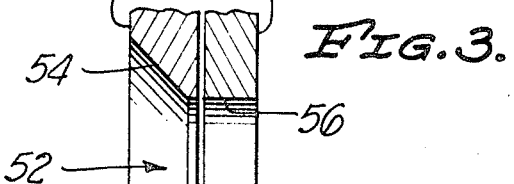
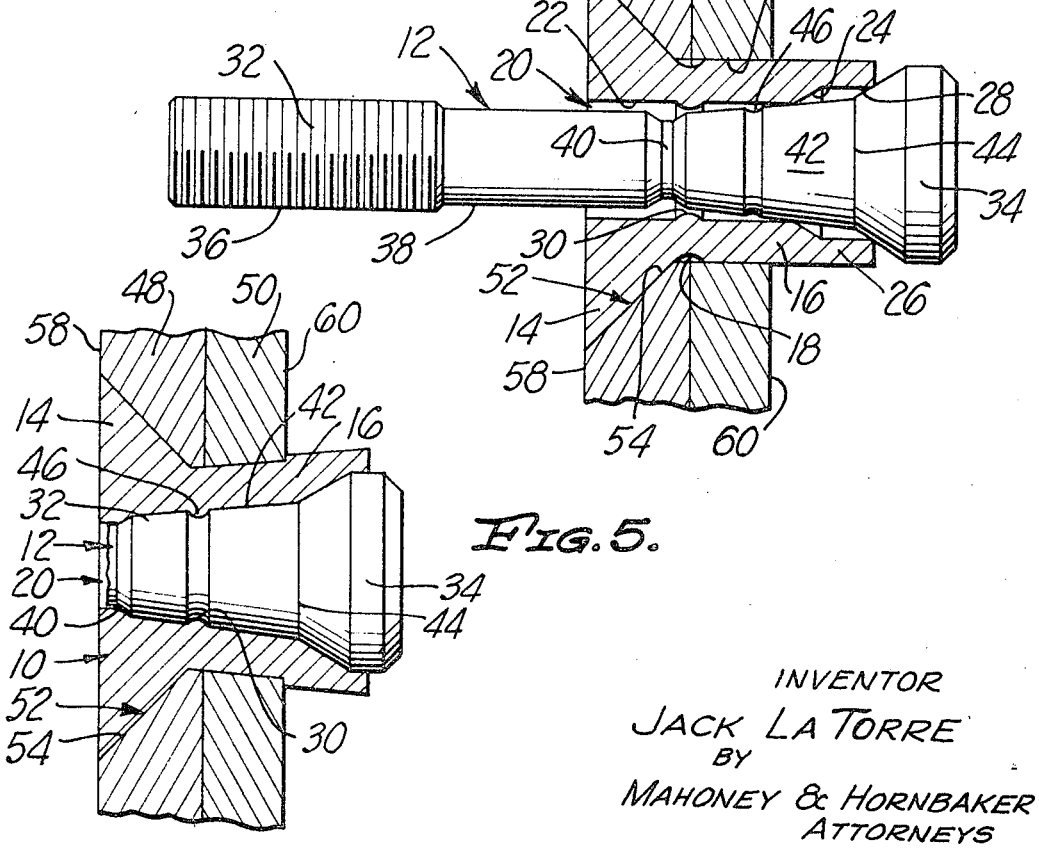
INVENTOR
JACK LA TORRE
BY
MAHONEY & HORNBAKER
ATTORNEYS

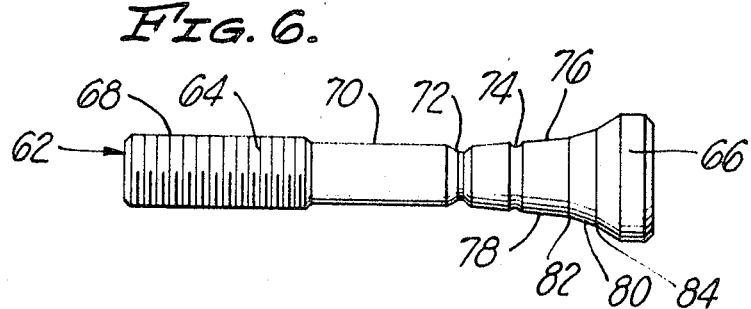
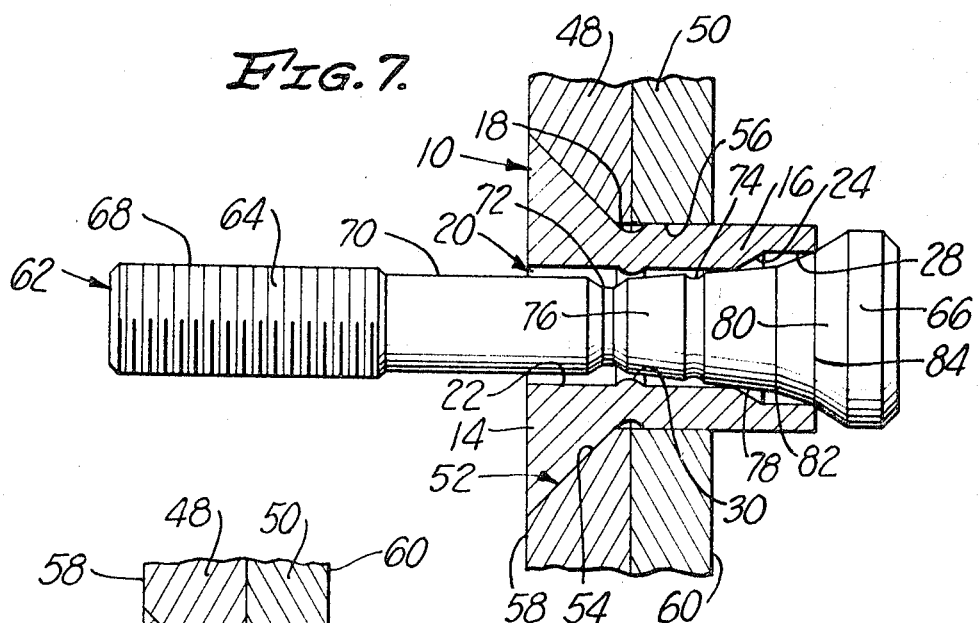

United States Patent Office 3,460,429
Patented Aug. 12, 1969

3,460,429
EXPANSIBLE FASTENER WITH
EXPANDER THEREFOR
Jack La Torre, 13 Rivo Alto Canal, Naples,
Long Beach, Calif. 90803
Filed Apr. 19, 1967, Ser. No. 631,946
Int. Cl. F16b 13/04, 19/08, 33/04
U.S. Cl. 85—78                                    3 Claims

ABSTRACT OF THE DISCLOSURE

A malleable titanium alloy fastener, specifically heat treated, has a sleeve extending through a member for upset to clamp the member. A fastener expander is positioned within a sleeve bore and is movable axially relative to the sleeve, wherein an expander end mandrel causes the sleeve upset, while simultaneously, a mandrel tapered stem causes direct radial expansion of the sleeve and member internally of the member over a progressively increasing axial distance, work hardening surfaces of the sleeve and member. During the sleeve and member radial expansion, a radial interengagement is formed between the sleeve and expander for trapping the mandrel supporting the sleeve.

Background of the invention

This invention relates to an expansible fastener of the type comprising a sleeve extending through a member for upset to clamp the member and an expander positioned within the sleeve and axially movable relative to said sleeve for causing the sleeve upset. More particularly to the present invention, both the sleeve and expander are preferably formed of a malleable titanium alloy, specifically heat treated to provide the sleeve deformable without metal fracture and both the sleeve and expander of relatively high strength.

The present invention also includes a specific formation of the expander providing a direct radial force against the fastener sleeve during the sleeve upset to work harden surfaces of the sleeve and member internally of the member, and preferably also forming a radial interengagement between the fastener sleeve and expander to trap the expander within the sleeve and supporting the sleeve.

Fasteners of the general character herein involved are normally used for securing together two or more plate-like members wherein one surface of the assembled plate-like members is exposed and the other surface thereof is blind or inaccessible. A bore for reception of the fastener is formed through the assembled plate-like members and the particular fastener is inserted in the bore axially engaged with the member exposed side and protruding from the member blind side. Such fasteners are formed with a fastener sleeve constructed to form the ultimate fastening element upon upset thereof from the member blind side, and an expander extending axially through the sleeve and accessibly protruding from the member exposed side.

Thus, by engaging the expander at the member exposed side while retaining the sleeve properly positioned within the member bore, it is possible to draw the expander axially toward the member exposed side and relative to the sleeve for accomplishing the sleeve upset. Furthermore, the expander may be provided with a purposely weakened fracture section which ultimately fractures after the sleeve upset has been accomplished and permits removal of the entire portion of the expander protruding from the member exposed side. The portion of the expander remaining within the sleeve has been retained with the sleeve against accidental later displacement therefrom and from the member blind side merely by the interference fit formed between the expander and sleeve during the sleeve upset by the expander.

Prior fasteners of the foregoing type, where high strength is required, have normally been formed of one of the various relatively high strength, steel alloys in order that the final upset fastener sleeve will have sufficient strength for properly retaining the members assembled. Furthermore, it has been necessary to likewise form the fastener expanders of similar steel alloys so that the expanders will likewise have sufficient strength to accomplish the sleeve upset. Thus, where a relatively large number of fasteners are required for a particular member assembly, the individual weights of the fasteners including the fastener sleeve weights, as well as the weights of the expander portions finally remaining therein, can become quite a critical factor in the overall weights of the member assemblies.

Under such high strength requirements, the fasteners cannot be formed of aluminum, since, obviously, even the more dignified aluminum alloys will not approach the strengths of the steel alloys. There is at least one titanium alloy, namely, 6Al-4V titanium, which will meet the strength requirements, but prior to the present invention, such titanium alloy, when heat treated to provide the strength requirements, has had physical characteristics which make it impossible to form the type of fastener herein involved which will not fracture when it is attempted to rework the same for the final fastening upset. The result has been, therefore, that all such fasteners provided, prior to the present invention, have necessarily been formed of the alloy steels, despite the consequent weight problems involved therewith.

Still a further factor with the character of fasteners herein involved is the fact that in order to accomplish the sleeve upset in the manner described, it is necessary that the sleeve will be formed of a relatively malleable metal tending toward softer characteristics whereas, after the securement of the fasteners, it is desirable to have relatively hard mating surfaces between the secured members and the fastener in order to increase the shear strength of the fasteners and prevent transverse working between the members and fasteners which could result in early failure of the assembly.

All prior fasteners have, in effect, merely included straight cylindrical sleeves having merely the end parts thereof protruding from the member blind sides expanded to axially clamp the members. There has been no known means with the prior fasteners for obtaining sufficient working of the fastener sleeve metal axially internally of the fastened members so as to obtain increased transverse clamping and strengthening of the fastener sleeve metal and member metal at these internal locations.

Objects and summary of the invention

It is, therefore, an object of my invention to provide an expansible fastener with an expander therefor of the foregoing type wherein, at the latter stages of the expander sleeve securement, a definite radial interengagement is formed between the fastener sleeve and expander so as to retain the expander in a predetermined final position and against later displacement from the fastener sleeve. Such radial interengagement, in its optimum form, is obtained by providing a radially inwardly extending, annular bead internally of the fastener sleeve positioned so as to be received in and fill an annular groove of the fastener expander at the point when the expander has reached substantially its full axial movement relative to the sleeve during the sleeve expansion and securement operation. This results, not only in a virtually immovable retainment of the fastener expander within the fastener sleeve preventing any possible displacement therefrom, but also retains the expander firmly supporting and adding metal strength to the sleeve so as to strengthen the overall assembly.

It is a further object of my invention to provide an expansible fastener of the foregoing type wherein the fastener sleeve, and also preferably the fastener expander, are formed of a titanium alloy having the strength characteristics comparable to the alloy steels previously used, yet the fastener sleeve may be reworked in the manner required for the final securement without metal fracture and, as a matter of fact, increased metal strength. I have discovered, according to the present invention, a particular heat treatment procedure with which the only known titanium alloy, namely, 6Al-4V titanium, may be provided with the necessary strength while retaining malleability so that the fastener sleeve upset may be accomplished without metal fracture and provide a final fastener strength comparable to the previously used alloy steels. Thus, with the use of such titanium alloy, it is possible to gain the marked weight saving in the final assembly of titanium, yet with the tensile and shear strengths of the prior fasteners formed of the alloy steels.

It is still a further object of my invention to provide an expansible fastener of the foregoing type wherein, by a unique formation of the fastener expander, it is possible during the expander sleeve securement operation to apply a direct radial outward force against the fastener sleeve between the expander and sleeve, and consequently also between the sleeve and internal member surfaces, thereby increasing the fastener securement and equally important, actually reworking and increasing the strength of the member and fastener metal. The metal surfaces between the members and fastener sleeve, and between the fastener sleeve and the fastener expander are axially work hardened so as to increase the fastener metal strength and the member metal strength surrounding and internally of the members. Such metal reworking and work hardening is preferably accomplished by forming the fastener expander with the somewhat conventional tapered mandrel portion and, according to the present invention, providing the expander driving stem with a decreasing taper extending from the mandrel toward the opposite side of the members so that as the expander is drawn axially relative to the fastener sleeve for securement of the fastener sleeve in the members, such additional taper will act directly radially against the expander sleeve and member internal surfaces over a progressively increasing axial length of the fastener sleeve and members, thereby reforming and cold working the fastener sleeve surfaces and the member internal surfaces.

Other objects and advantages of the invention will be apparent from the following specification and the accompanying drawings, which are for the purpose of illustration only.

Brief description of the drawings

FIG. 1 is a side elevational view of an embodiment of the fastener sleeve illustrating certain principles of the present invention;

FIG. 2 is a side elevtaional view of an embodiment of the fastener expander usable with the fastener sleeve of FIG. 1 and illustrating certain of the principles of the present invention;

FIG. 3 is a fragmentary, vertical, sectional view of a pair of plate members prepared for receiving the fastener of FIGS. 1 and 2 and for securement by said fastener;

FIG. 4 is an enlarged, fragmentary, vertical, sectional view, part in elevation, showing the assembly of the fastener of FIGS. 1 and 2 with the plate members of FIG. 3 and preparatory to the fastener sleeve being upset by the fastener expander;

FIG. 5 is a view similar to FIG. 4, with the fastener manipulated to secure the plate members in fiinal assembled form;

FIG. 6 is a side elevational view of a further embodiment of the fastener expander;

FIG. 7 is a view similar to FIG. 4, but using the fastener expander of FIG. 6; and FIG. 8 is a view similar to FIG. 5, but showing the final assembly with the fastener expander of FIG. 6.

Description of the best embodiments contemplated

Referring to FIGS. 1 through 5 of the drawings, a fastener illustrating certain of the principles of the present invention includes a fastener sleeve, generally indicated at 10, and a fastener expander, generally indicated at 12, both of which, for maximum advantages, are preferably formed of a malleable titanium alloy, preferably 6Al-4V titanium, specifically heat treated in a particular manner to be hereinafter described.

The fastener sleeve 10 is formed with a tapered head 14, a straight cylindrical shank 16 and an outer annular groove 18 preferably at the point of juncture between the head and shank, said outer groove preferably being arcuate in axial cross section. The fastener sleeve 10 is further formed with a generally cylindrical bore 20 axially therethrough, said bore comprising a straight main cylindrical portion 22 extending axially through the sleeve head 14 and the major portion of the sleeve shank 16, an outwardly tapered portion 24 extending axially from the main cylindrical portion and in an end part 26 of the sleeve shank, and a straight enlarged cylindrical portion 28 axially completing the end part and the fastener shank.

Important to certain of the principles of the present invention, the main cylindrical portion 22 of the sleeve bore 20 is interrupted by a radially inwardly extending, annular projection 30 axially intermediate said main cylindrical portion. The projection 30 radially corresponds with the previously described sleeve outer groove 18, having the same arcuate axial cross section. In manufacturing procedure of the fastener sleeve 10, the sleeve outer groove 18 is formed and such formation automatically forms the radial inward projection 30, said projection serving to ultimately form the initiation of a radial interengagement between the fastener sleeve 10 and the fastener expander 12 during upsetting of the sleeve for final securement, as will be hereinafter described.

The fastener expander 12 is comprised of a generally cylindrical driving stem 32 terminating axially at an integrally joined, somewhat conventional, enlarged tapered mandrel 34. The expander 12 is somewhat complex and begins with a drawing tool gripping portion 36, then a straight cylindrical portion 38 which terminates axially in an annular, weakened fracture groove 40, all of which is generally conventional, except for the materials from which the expander is formed. Extending axially from the fracture groove 40, the expander 12 is formed with a novel tapered metal working portion 42 which makes up the remainder of the driving stem 32 and joins axially into the tapered mandrel 34 at the annular juncture 44.

The tapered metal working portion 42 of the expander driving stem 32 is important to certain of the principles of the present invention and for optimum results, tapers at an angle of from ½° to 1° to the axis of the expander 12 joining axially at the juncture 44 into the preferably 9° taper of the mandrel 34. Furthermore, and likewise important to certain of the principles of the present invention, the tapered metal working portion 42 is axially interrupted at a specific axial location intermediate said tapered metal working portion by an annular trapping groove 46, which is arcuate in axial cross section and is located so as to ultimately receive the previously described radial inward projection 30 of the fastener sleeve 10 at the conclusion of the fastener sleeve collapse to be hereinafter described. Both the juncture 44 and trapping groove 46 of the expander 12 are roller work hardened to strengthen the expander metal at such locations.

Referring particularly to FIG. 3, the fastener hereinbefore described may be used for securing together adjacent plate members 48 and 50, which are prepared for securement with a through bore 52 comprised of a countersunk portion 54 conforming to the fastener sleeve head 14 and a straight cylindrical portion 56 conforming to the fastener sleeve shank 16. Thus, the assembled plate members 48 and 50 are provided with an exposed side 58 and a blind side 60. Furthermore, the plate members 48 and 50 may be formed of any usual metal, depending on the particular requirement conditions, such as steel, aluminum or titanium. The titanium is preferred where weight and high strength are factors, with aluminum being equally applicable where weight is still a factor, but the strength requirements are reduced.

In the fastening operation, the unexpanded fastener sleeve 10 is assembled with the fastener expander 12, both of which are assembled in the plate member bore 52, as shown in FIG. 4. In such assembled position, the expander driving stem 32 projects axially from the sleeve head 14 so that the stem gripping portion 36 and the major part of the stem cylindrical portion 38 are exposed at the plate member exposed side 58. Furthermore, the sleeve head is axially engaged with the plate member exposed side 58, while the sleeve shank 16 projects axially from the plate member blind side 60.

A conventional drawing tool, not shown, is then engaged with the gripping portion 36 of the expander driving stem 32 while bearing against the sleeve head 14 so that operation of said tool draws the expander 12 axially relative to the sleeve 10. As the expander 12 moves axially relative to the sleeve 10, the tapered metal working portion 42 of the expander driving stem 32 initially commences an axial metal flow of the fastener sleeve 10 in in the direction toward the sleeve head 14 and then begins simultaneously to exert a direct outward radial force against the sleeve 10 internally of the plate member bore 52 and radially against the plate members 48 and 50.

There is initially only slight radial expansion of the sleeve end part by the expander mandrel 34 and primarily a similar axial metal flow forming a part of the sleeve metal flow within the plate member bore 52.

As the axial metal flow of the fastener sleeve 10 continues and the outward radial force by the tapered metal working portion 42 of the expander 12 continues over a progressively increasing axial length of the fastener sleeve 10, the fastener sleeve circumferentially expands, causing a commensurate circumferential expansion of the plate member bore 52, as illustrated in FIG. 5. Finally, the major part of the radial expansion of the sleeve end part 26 takes place against the plate member blind side 60, and the expander trapping groove 46 reaches the sleeve projection 30 causing a full radial interengagement between the fastener sleeve and expander 10 and 12 by the projection filling said expander trapping groove. Instantaneously after the fastener sleeve 10 is fully expanded and the fastener expander 12 is finally thusly positioned, the continued drawing force against the expander driving stem 32 causes the driving stem to fracture at the weakened fracture groove 40 so as to completely remove the expander gripping and cylindrical portions 36 and 38.

Thus, not only has the fastener sleeve 10 been secured with the plate members 48 and 50 by the radial expansion of the sleeve end part 26 so as to axially clamp said plate members, but also the outward direct radial force caused by the tapered metal working portion 42 of the expander driving stem 32 has caused a work hardening of the internal and external surfaces of the fastener sleeve 10, as well as the internal surfaces of the plate members 48 and 50. Still further, a radial metal interengagement has been formed between the fastener sleeve and expander 10 and 12 securely retaining the expander within the sleeve against axial displacement and equally as important, retaining the expander fully radially supporting the sleeve. Such full radial support is shown in FIG. 5 wherein the tapered metal working part 42 of the expander 12 extends substantially the full axial distance of the plate members 48 and 50, and the sleeve 10 therein.

The marked advantage of the sleeve metal reworking and sleeve and plate member surface work hardening is illustrated by the fact that it has been found that the expander of the present invention has a minimum fatigue life increase of 30 to 50 percent over prior similar fasteners formed of the steel alloys.

Referring to the embodiment of the invention illustrated in FIGS. 6 through 8, the fastener sleeve 10 and plate members 48 and 50 are virtually identical to that hereinbefore described, with only the fastener expander, in this case, expander 62, being slightly altered for greater axial metal flow of the fastener sleeve, as well as greater surface work hardening of the fastener sleeve and plate members 48 and 50. In this embodiment, the expander 62 includes a driving stem 64 and a mandrel 66, with the mandrel being virtually the same with the exception of a slight reduction in axial length thereof. Furthermore, the driving stem 64 includes the same gripping portion 68, cylindrical portion 70, fracture groove 72 and trapping groove 74, with the prime alteration being in the tapered metal working portion 76.

As illustrated, the tapered metal working portion 76 of the expander 62 is formed with a minor tapered portion 78 of the same ½° to 1° extending axially from the fracture groove 72 toward the mandrel 66. The minor tapered portion 78, however, terminates axially in a major tapered portion 80 beginning at the juncture 82 and terminating axially at the juncture 84 with the mandrel 66, both said junctures again being roller work hardened for strength. The major tapered portion 80 extends at an angle of preferably 8½° to the axis of the expander 62, so as to be slightly less than the 9° taper on the mandrel 66.

Thus, the securement of the fastener sleeve 10 with the expander 62, as shown in FIG. 8, is virtually the same, with the exception of the increased axial metal flow of the sleeve and the increased surface work hardening of the sleeve and the plate members 48 and 50, as hereinbefore discussed.

It will be noted that in all illustrations of the various tapers of the fastener expanders 12 and 62, the angularity of such tapers has been exaggerated in order to more clearly point out the principles of the present invention.

As hereinbefore stated, the fasteners of the present invention may be formed of a malleable titanium alloy not heretofore useable for such purposes due to the prior metal fracture resulting from the necessary metal reworking. I have found that by use of a specific and novel heat treatment of the fastener sleeves, it is possible to form such sleeves from 6Al-4V titanium in view of the fact that such heat treatment provides said titanium alloy with high strength, yet sufficient malleability so as to permit the necessary metal reworking without metal fracture or weakening. Also, by use of a novel and specific heat treatment of the fastener expanders formed of the same titanium alloy, it is possible to provide said expanders of sufficient metal strength so as to accomplish the metal working of the fastener sleeves for the final sleeve securement, and particularly in the unique manner and providing the marked new results of the present invention hereinbefore described.

In the fabrication of the fastener sleeves 10 from 6Al-4V titanium and the new and novel heat treatment thereof, the fastener sleeves are forged at a forging temperature near but slightly below the beta transis range of said titanium alloy, said beta transis for said titanium alloy being about 1825° F. and said forging temperature preferably not being above 1725° F. and within the range of 1625° F. to 1725° F. After forging, if the next step of the fabrication and heat treatment is not carried out immediately, the fastener sleeves should be slow cooled in air from forging temperature to room temperature, but I have discovered that it is extremely critical to the final heat treatment results that the fastener sleeves must be transferred to a controlled inert gas atmosphere furnace, preferably 99.8 percent pure argon, within 8 hours after forging, preferably from 0 to 6 hours. It has been found that titanium alloys will self age harden to a point where the ductility of the metal decreases and eventually is nonexistent, unless such transfer is carried out within the time cycle set forth.

After transfer to the controlled atmosphere furnace, the fastener sleeves are solution treated in said furnace for a time period of 10 to 15 minutes, again at a temperature near but slightly below the beta transis range of the titanium alloy, preferably 75° below the beta transis or at 1750° F. After the solution treating, the fastener sleeves are furnace cooled in the inert atmosphere at a controlled rate in the order of 50° to 100° per hour to at least 1050° F. Again, it is preferred that a duplex solution treatment be used, that is, merely a repeat of the foregoing solution treatment and cooling in order to assure the maximum benefits of the heat treatment.

After the foregoing heat treatment of the fastener sleeves, a minimum .004 inch of surface metal, preferably in the range of .004 inch to .006 inch, is removed from all surfaces of the fastener sleeves in order to assure removal of all oxide contaminants. The fastener sleeves are then ready for use and prior to any metal reworking and surface hardening, as hereinbefore described, the titanium alloy metal of said fastener sleeves will have an ultimate tensile strength range in the order of 150,000 p.s.i. to 180,000 p.s.i., and a shear strength range in the order of 90,000 p.s.i. to 108,000 p.s.i. Furthermore, the metal of the fastener sleeves will be highly malleable and able to withstand the later metal reworking and upset without metal fracture.

The fabrication and heat treatment of the fastener expanders 12 or 62, as hereinbefore described, includes the steps of forging said fastener expanders from the 6Al-4V titanium alloy at the forging temperature near but slightly below the beta transis of the titanium alloy, preferably not above 1725° F. and in the range of 1625° F. to 1725° F. The same criticality of the transfer after forging to the controlled inert gas atmosphere furnace applies and must not be over 8 hours, preferably 0 to 6 hours after the forging, with any transfer time lag being constituted by slow cooling of the fastener expanders in air to room temperature.

In the controlled atmosphere furnace, the fastener expanders are solution treated for a time period in the order of 10 to 15 minutes at the temperature near but slightly below the beta transis range of the titanium alloy, preferably in a temperature range in the order of 1590° F. to 1610° F. The solution treatment is followed immediately by an agitated water quench, said water quench being arranged to provide full quenching in the maximum time of about 6 seconds. Still in said controlled atmosphere, the fastener expanders are then age hardened at a temperature in the order of 950° F. to 970° F. for substantially 6 hours and then are air cooled to room temperature.

Finally, the same surface oxide contaminant removal of all exposed surfaces of the fastener expanders is carried out, that is, the removal of a minimum of .004 inch of surface metal and preferably in the order of .004 inch to .006 inch. The resulting fastener expanders will likewise be relatively malleable, with the titanium alloy metal thereof having an ultimate tensile strength range in the order of 160,000 p.s.i. to 190,000 p.s.i. and a shear strength range in the order of 96,000 p.s.i. to 114,000 p.s.i. The additional roller work hardening of the surfaces of the fastener expander trapping grooves 46 or 74 and the junctures 44 or 82 and 84, as hereinbefore described, is carried out prior to use of the expanders.

In the final assembled form of the fasteners of the present invention using the titanium alloy and heat treatment set forth and the metal reworking and upset of the fastener sleeves 10 combined with the secure retainment of the fastener expanders 12 or 62 within the fastener sleeves for supporting said sleeves, the strength of the overall fastener assembly is increased to that of the fastener expanders and will have an ultimate tensile strength range in the order of 160,000 p.s.i. to 190,000 p.s.i. and a shear strength range in the order of 96,000 p.s.i. to 114,000 p.s.i. Furthermore, as hereinbefore discussed, the work hardening of the fastener sleeve metal surfaces and the plate member internal metal surfaces will greatly increase the fatigue life of the overall assembly.

Thus, the fasteners of the present invention having all of the unique features and advantages as outlined, may be formed of a titanium alloy providing the consequent weight saving attributes, yet the fasteners will have comparable strength and increased fatigue life over similar fasteners formed of steel alloys having nearly double the assembled weight. Also, the direct radial metal interengagement between the fastener sleeves and expanders will assure that the expanders remain properly in assembly and fully supporting the fastener sleeves throughout the life of the fasteners, assuring the reatainment of the physical strength thereof.

I claim:

1. In a fastener of the type for expansible securement in a bore of a member having generally in combination: a fastener sleeve having a head and shank, an axial bore through said head and shank, said sleeve being adapted for positioning in said member bore with said sleeve head engaged with an exposed side of said member, said sleeve shank extending through said member bore with an end part projecting axially from a blind side of said member; an expander in said fastener sleeve bore having an enlarged mandrel engaged with said end part of said sleeve shank at said member blind side and a driving stem extending from said mandrel through said sleeve shank and head, means on said mandrel for radially expanding and axially reducing said sleeve shank upon axial movement of said expander relative to said fastener sleeve toward said fastener sleeve head to axially engage said sleeve shank end part with said member blind side and secure said fastener with said member; the improvements including: decreasing taper means formed on said expander stem axially adjacent and extending axially away from said expander mandrel toward said member exposed side, said taper means axially throughout said taper means radially engaging at least a part of said fastener sleeve shank between said member exposed and blind sides and forcing said fastener sleeve radially outwardly conforming exactly to said taper means and forced radially against said member to radially expand said fastener sleeve during said expander relative movement in said fastener securement; and radially interfitting engagement means between said fastener sleeve and said expander axially intermediate said member exposed and blind sides including radially inwardly extending annular projection means on said fastener sleeve formed integral of said fastener sleeve and received radially in matching radial annular recess means formed in said expander axially intermediate said decreasing taper means of said expander stem, said annular projection and recess means being preformed prior to said fastener securement and being accurately axially positioned formed radially and axially interengaged in both axial directions during said expander relative axial movement in said fastener securement for retaining said expander axially stationary in both axial directions relative to said fastener sleeve at the conclusion of said fastener securement and securely retain said fastener sleeve radially expanded against said member.

2. In a fastener of the type for expansible securement in a bore of a member and having generally in combination: a fastener sleeve having a head and shank, an axial bore through said head and shank, said sleeve being adapted for positioning in said member bore with said sleeve head engaged with an exposed side of said member, said sleeve shank extending through said member bore with an end part projecting axially from a blind side of said member; an expander in said fastener sleeve bore having an enlarged mandrel engaged with said end part of said sleeve shank at said member blind side and a driving stem extending from said mandrel through said sleeve shank and head, means on said mandrel for radially expanding and axially reducing said sleeve shank upon axial movement of said expander relative to said fastener sleeve toward said fastener sleeve head to axially engage said sleeve shank end part with said member blind side and secure said fastener with said member; the improvements including: decreasing taper means on said expander stem axially adjacent and extending axially away from said expander mandrel toward said member exposed side; said expander enlarged mandrel being an enlarged tapered mandrel and said expander stem taper means including a major tapered portion extending axially from said expander tapered mandrel toward said member exposed side and a minor tapered portion extending from said major tapered portion axially toward said member exposed side, said major tapered portion tapering at an angle less than said tapered mandrel and greater than said minor tapered portion; said expander stem taper means radially engaging at least a part of said fastener sleeve shank between said member exposed and blind sides and forcing said fastener sleeve radially outwardly against said member to radially expand said fastener sleeve during said expander relative movement in said fastener securement; a major part of said fastener sleeve bore extending uniformly cylindrical prior to said radial expansion by said expander, a part of outer surfaces of said fastener sleeve shank extending uniformly cylindrical and mating with uniformly cylindrical member surfaces about said member bore prior to said radial expansion by said expander; portions of each of said cylindrical parts of said fastener sleeve bore and said outer surfaces of said fastener sleeve shank and said member surfaces being reformed tapered and simultaneously cold worked during said radial expansion by said expander and as caused by said expander stem taper means; and radially interfitting engagement means between said fastener sleeve and said expander axially intermediate said member exposed and blind sides including radially inwardly extending annular projection means on said fastener sleeve received radially in matching radial annular recess means in said expander axially intermediate said minor tapered portion of said expander stem, said projection and recess means being preformed prior to said fastener securement and being accurately axially positioned to be formed radially interengaged during said expander relative axial movement in said fastener securement for retaining said expander stationary relative to said fastener sleeve at the conclusion of said fastener securement and said fastener sleeve radially outwardly against said member.

3. A fastener as defined in claim 2 in which said expander stem major tapered portion tapers at an angle in the order of 8½ degrees and less than said tapered mandrel, said minor tapered portion tapering at an angle in the order of ½ degree to 1 degree.

References Cited

UNITED STATES PATENTS

| 3,377,908 | 4/1968  | Stau et al. | 85—78 |
| 2,384,321 | 9/1945  | Lees        | 85—78 |
| 2,538,623 | 1/1951  | Keating     | 85—78 |
| 3,149,530 | 9/1964  | Kolec       | 85—77 |
| 3,288,016 | 11/1966 | Reynolds    | 85—78 |

FOREIGN PATENTS

| 596,275   | 12/1947 | Great Britain. |
| 856,808   | 12/1960 | Great Britain. |
| 1,010,802 | 11/1965 | Great Britain. |

MARION PARSONS, Jr., Primary Examiner

U.S. Cl. X.R.

29—522; 75—175